United States Patent [19]
Plouffe

[11] 3,753,043
[45] Aug. 14, 1973

[54] CONDITION RESPONSIVE CONTROL APPARATUS

[75] Inventor: Leo A. Plouffe, Attleboro, Mass.

[73] Assignee: Texas Instruments Incorporated, Dallas, Tex.

[22] Filed: Apr. 12, 1972

[21] Appl. No.: 243,327

[52] U.S. Cl. ......... 317/13 A, 317/27 R, 317/335 C, 317/41, 317/141 S, 317/148.5 B, 317/36 TD
[51] Int. Cl. ............................................ H02h 7/08
[58] Field of Search ................ 317/148.5 B, 36 TD, 317/13 R, 13 A, 335 C, 41, 27 R, 141 S; 307/293

[56] References Cited
UNITED STATES PATENTS

| | | | |
|---|---|---|---|
| 3,417,297 | 12/1968 | Wallentowitz................ | 317/148.5 B |
| 3,408,540 | 10/1968 | Nield............................ | 317/148.5 B |
| 3,379,939 | 4/1968 | Obenhaus..................... | 317/148.5 B |

Primary Examiner—J. D. Miller
Assistant Examiner—Harvey Fendelman
Attorney—Harold Levine, John A. Haug et al.

[57] ABSTRACT

A circuit is disclosed for determining, after a predetermined period of time has elapsed following the energization of a load, such as an air-conditioning compressor, whether a certain condition exists, such as whether operating oil pressure level has been reached in the compressor, and for shutting down and locking out the air-conditioning system if the condition does not exist. The circuit is reset either by removing power therefrom or by actuating a push button switch. In one embodiment a pressure switch is employed to determine the oil pressure level while in another embodiment a temperature dependent resistor is used to determine the presence of the oil. The circuit can be used in conjunction with another circuit for controlling the energization of the compressor motor dependent upon the temperature of the winding of the motor or other desired parameters to be monitored.

19 Claims, 5 Drawing Figures

CONDITION RESPONSIVE CONTROL APPARATUS

This invention relates to control apparatus and more particularly to apparatus for timing a selected period testing for the existence of a predetermined condition and producing a signal dependent on whether or not the condition exists.

When some equipment is first energized it is desirable as a safety measure to determine after a certain period of time whether a condition exists and then either allow the equipment to remain energized if the condition does exist or to deenergize the equipment if it does not exist. An illustration of this would be compressor motors for unitary type air-conditioners in which, under normal operating conditions, oil pressure increases to a predetermined level a short time after energization of the system. If, for some reason, the oil pressure does not come up to this level due to some malfunction it is desirable to shut down the system before further damage to the equipment occurs. Thus, after a certain period of time has elapsed after energization of the system it is desirable to test the oil pressure level and to either allow the system to remain energized or to shut it down depending on whether or not the oil pressure is sufficiently high.

While there are prior art timing devices available to perform this timing function they have various ilmitations which make them unsuitable for the intended purpose. For instance, conventional electromechanical timers can be made to be very reliable; however, they are too costly. Various thermal timers have been used and offer the advantage of low cost; however, they suffer from the disadvantage of not being sufficiently accurate and of being sensitive to variations in ambient temperature.

It is therefore an object of the invention to provide control apparatus which tests for the existence of a predetermined condition after a certain period of time has elapsed following the energization of a system and to produce a signal dependent on the existence of the said condition which does not have the limitations of prior art approaches. Another object is the provision of such control apparatus which is inexpensive, reliable and which is not sensitive to variations in ambient temperature.

Another object of the invention is to provide control apparatus of the type described which can be used either by itself or in conjunction with control apparatus employed to monitor or respond to various other parameters. For instance, in copending application, Ser. No. 243,328, filed Apr. 12, 1972 and assigned to the assignee of the instant application, control apparatus is disclosed and claimed which can be used, among other things, to monitor the temperature of the winding of a compressor motor and for shutting down the air-conditioning system in the event the temperature of the windings rises to an unsafe level. It is desirable to modify this control to include the function of testing for the existence of a predetermined condition after a certain period of time has elapsed following the energization of the system and to produce a signal dependent on the existence of the said condition as well as serving its other function of temperature monitoring. Thus, it is another object of the invention to provide apparatus which will determined after a certain period of time whether a condition exists and then either allow the system to remain energized or to deenergize it, which apparatus can be used with temperature monitoring apparatus without effecting the operation in any substantial way of the temperature monitoring apparatus.

Another object is the provision of apparatus that will lock out the protected equipment if the predetermined condition does not exist when tested. Yet another object is the provision of such apparatus which will perform its timing function only if the temperature of the windings is at a safe level.

Other objects and features of the invention may be more readily understood from the following detailed description and appended claims when read in conjunction with the accompanying drawings.

The circuit for determining whether the oil pressure level or some other condition is at an acceptable level after a predetermined time delay following energization of a load such as an air-conditioning system is particularly suited for use with a second circuit which controls the energization of the air-conditioning compressor motor based on the temperature level of the windings. The second circuit essentially comprises a bridge circuit in which one half comprises a tapped transformer and the other half comprise a plurality of parallel connected voltage dividers. Each voltage divider includes a temperature responsive impedance in heat transfer relation with a motor winding. A transistor is connected to the junctions of the voltage dividers through an "or" gate and when forward biased shunts current away from the gate of a silicon-controlled rectifier serially connected to a relay controlling the energization of the motor thus turning the motor off.

The circuit of this invention uses the tapped transformer as half of another bridge circuit and adds another input to the transistor. It includes a voltage regulated power source, a logic circuit comprising a voltage divider whose junction is responsive to the state of energization of the relay and which controls the conductivity of a logic transistor. A timer circuit comprising a resistor-capacitor combination is actuated only when the logic transistor is non-conductive, in other words when the relay coil is energized. An impedance matching circuit comprises an emitter follower transistor which matches impedance levels between the timer and a detector circuit. The detector circuit in effect is an on-off switch including an NPN transistor whose collector is connected to the base of a PNP transistor. When the detector transistors are forward biased an output is fed to the base of the second circuit transistor turning it on and turning off the silicon-controlled rectifier and deenergizing the relay. This output is also fed back to the base of the detector NPN transistor increasing its forward bias to lock on the detector switch. The output is also fed back to the timing circuit to maintain the charge on the capacitor insuring positive lockout of the system. A pressure switch is connected across the capacitor and when closed causes the capacitor charge to drain preventing the capacitor from becoming charged when the detector switch is off and thus prevents the detector switch from turning on.

Thus, when the system is energized the logic circuit determines whether the motor is energized and if so permits actuation of the timing circuit. A predetermined period of time is required for the capacitor to become fully charged by which time the pressure switch will have closed if the oil pressure has reached the normal operating level and the capacitor charge is drained thereby preventing the detector switch from turning on and allowing continued energization of the system. Should the oil pressure level be insufficient to close the pressure switch after the predetermined period of time then the full capacitor charge causes the detector switch to turn on deenergizing the system and locking it out.

In the accompanying drawings.

Similar reference characters indicate corresponding parts throughout the views of the drawings.

Figure 1:
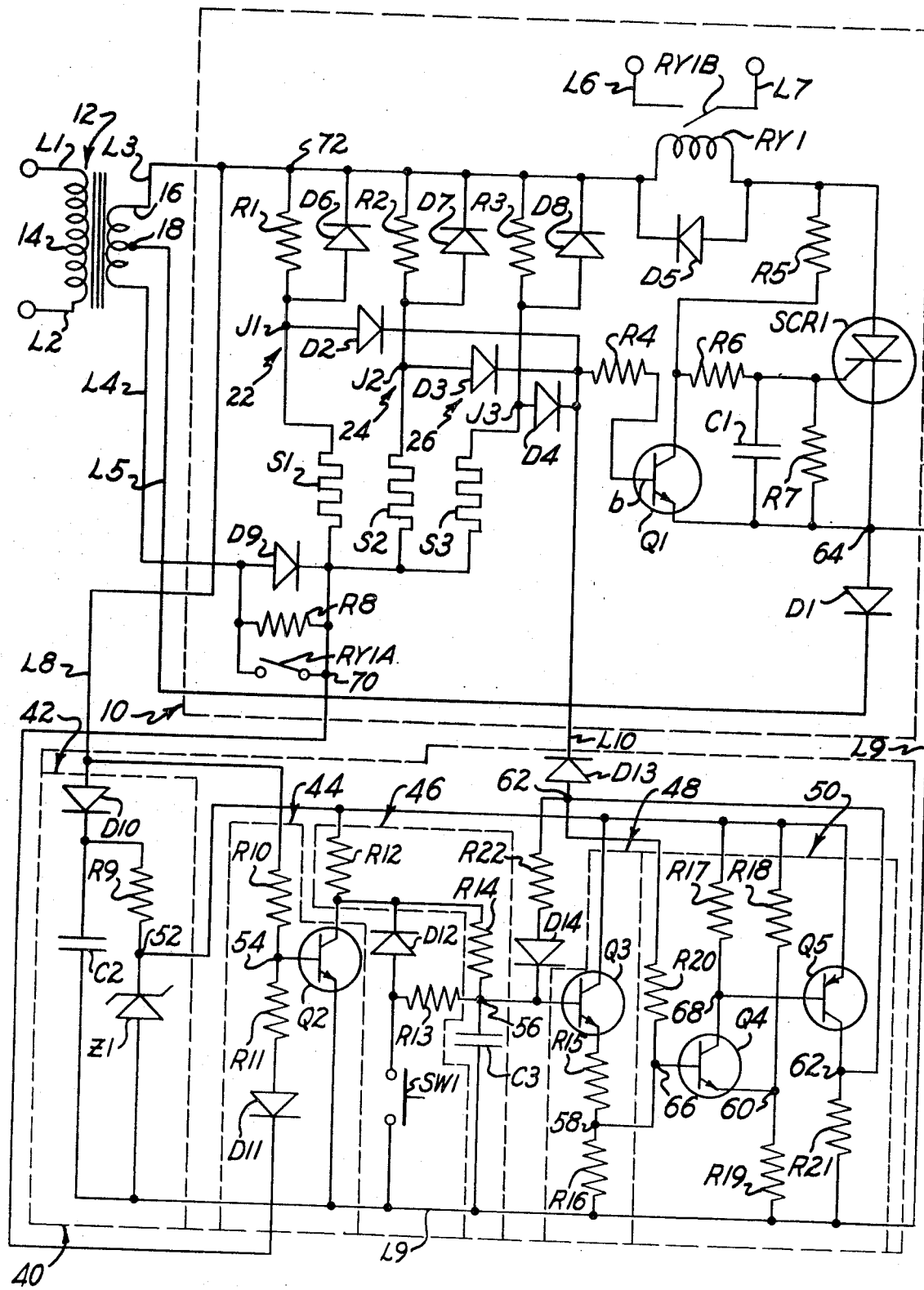
FIG. 1 is a schematic diagram of a preferred embodiment of the present invention.

Dimensions of certain of the parts as shown in the drawings may have been modified or exaggerated for the purpose of clarity of illustration.

Figure 2:
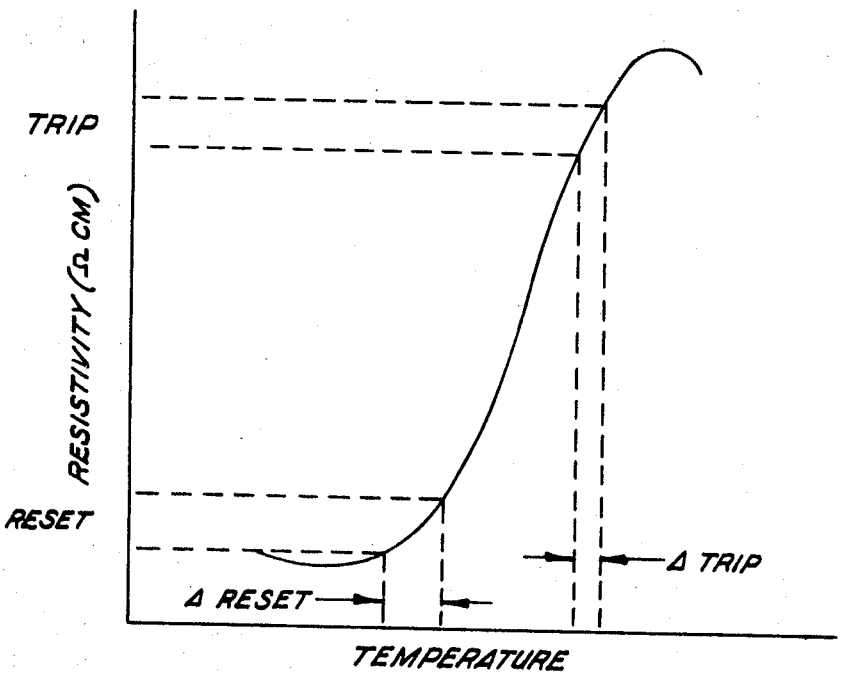
FIG. 2 is a resistance versus temperature curve for a typical sensor employed in the temperature monitoring portion of the apparatus.
Figure 3:
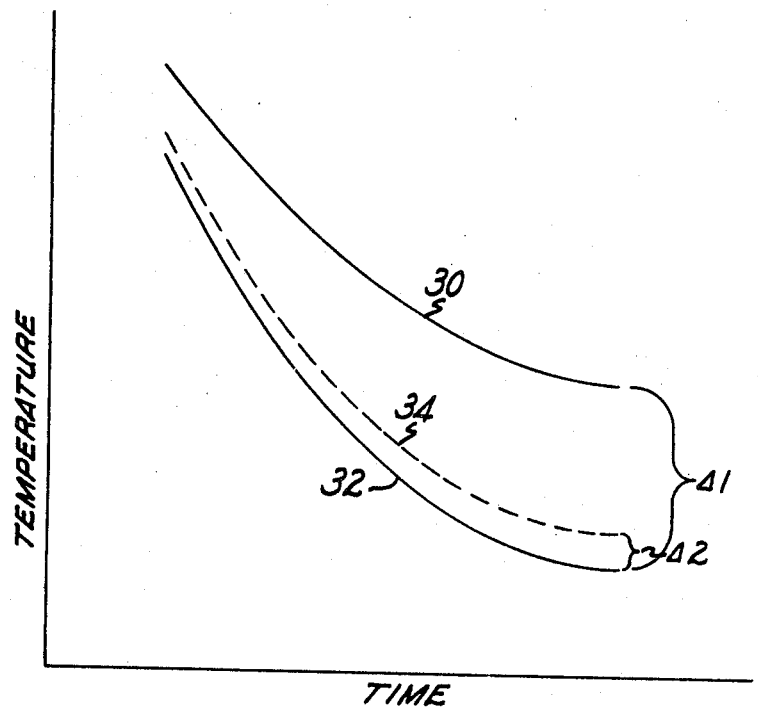
FIG. 3 is a temperature versus time curve for such a sensor and a load.

Referring now to FIGS. 1—3, the temperature monitoring portion 10 of the apparatus will first be described. This portion of the apparatus comprises a step up or step down transformer 12 depending upon the voltage source having a primary winding 14 to which are connected lines L1 and L2 for supplying power from a conventional A.C. source. Transformer 12 is provided with a secondary winding 16 having an intermediate tap 18. Tap 18 is preferably a center tap so that the voltages of the two half windings are matched. Lines L3 and L4 are connected to opposite ends of secondary winding 16 while line L5 is connected to the center tap 18.

Relay coil RY1 is connected between one side of winding 16 by line L3 and the center tap 18 by line L5. Also serially connected thereto is a silicon-controlled rectifier SCR1. Preferably a diode D1 is placed in line L5 to protect the base-emitter junction of Q1 from high negative voltage.

A plurality of voltage dividers 22, 24, 26 are connected in parallel across secondary 16. Each comprises a condition responsive impedance S1, S2, S3 respectively serially connected to a reference impedance R1, R2, R3 and form respective junctions J1, J2 and J3 therebetween. Condition responsive impedances S1, S2 and S3 are preferably formed of a steeply sloped positive temperature coefficient (PTC) of resistivity thermistors such as barium titanate doped with lanthanum. Although three voltage dividers are shown it will be understood that the number employed is a matter of choice depending on the application for which the circuit is to be used. In some instances it may be desirable to have only a single divider or channel while in other instances it may be desirable to have two or even more than three.

Junctions J1, J2 and J3 are connected to form an "or" gate to the base b of an NPN transistor Q1 through respective diodes D2, D3 and D4 and in series with current limiting resistor R4.

Resistor R5 interconnects the anode and gate electrodes of rectifier SCR1, providing triggering current to fire the rectifier when the forward direction of the A.C. voltage is applied across the anode-cathode circuit.

The emitter-collector output circuit of transistor Q1 is connected across the gate-cathode circuit of the silicon-controlled rectifier SCR1. Resistor R6 is connected between the collector and the gate of the rectifier SCR1 to obtain the correct impedance level. Capacitor C1 connected across the gate-cathode circuit of rectifier SCR1 decreases line transient sensitivity while resistor R7 also connected across the gate-cathode circuit of rectifier SCR1 is effective to minimize the effects of variation in triggering current due to the variation among silicon-controlled rectifiers and due to temperature variations.

Since the silicon-controlled rectifier is a device which permits current to flow in a single direction diode D5 is connected across relay winding RY1 to prevent the relay contacts from dropping out each half cycle by permitting the inductively stored current to free-wheel during alternate half cycles.

A reset or differential impedance R8 is serially connected between the voltage dividers and the line L4 side of secondary winding 16. Contacts RY1A, controlled by relay coil RY1, shunt impedance R8 and are closed when coil RY1 is in the energized condition.

For a purpose to be described below, reference impedances R1, R2, R3 and reset impedance R8 are shunted by respective diodes D6, D7, D8 and D9.

Relay coil RY1 also controls a second set of contacts RY1B in lines L6, L7 which may be part of the coil circuit of a contactor which connects a load (e.g., motor) to a power source.

Operation of this portion of the circuit will be described by assuming that the instantaneous polarity of the potential of line L3 is positive unless otherwise stated. The voltage divider 22 forms a bridge with the tapped winding 16 which has a detector circuit including diode D2, resistor R4, transistor Q1 and diode D1. As mentioned above S1 is a PTC thermistor which may be embedded in the windings of a motor to be protected. During normal operation voltage is supplied by transformer 12 from a conventional A.C. source. Current flows through bridge 16/22 with essentially no current flowing in the detector circuit since the impedance of sensor S1 is lower than that of reference impedance R1. Triggering current is supplied to silicon-controlled rectifier SCR1 through resistor R5 turning the rectifier on each positive half cycle. Current flowing through relay coil RY1 maintains contacts RY1B closed and hence main-tains energization of the load. Contacts RY1A are also maintained closed by current flow through relay coil RY1 thereby shunting reset impedance R8. If the winding temperature increases beyond a predetermined safe limit the resistance of thermistor S1 increases causing the voltage at junction J1 to increase to a potential higher than at tap 18 thereby causing current to flow into the base of transistor Q1 causing it to conduct current in the collector-emitter circuit. When Q1 is in the conductive state it shunts current around the gate-cathode circuit of silicon-controlled rectifier SCR1 so that it is not turned on at the beginning of each half cycle and relay coil RY1 is then deenergized and contacts RY1A and RY1B open.

When contacts RY1A open impedance R8 is placed in the circuit which further increases the voltage at junction J1 thereby insuring positive action of the silicon-controlled rectifier SCR1 and relay RY1 avoiding chattering of contacts RY1B. As noted above, during normal operation contacts RY1A are closed. Provision of contacts which are in the closed condition when relay coil RY1 is energized results in immediate inclusion of impedance R8 upon deenergization of relay coil RY1 and consequent increase in voltage at junction J1 insuring that contact chattering is eliminated.

Upon cessation of current in relay winding RY1 contacts RY1A open immediately. The inclusion of impedance R8 causes a differential in temperature between that temperature at which the relay is deenergized and the contacts opened and that temperature at which the relay is again energized and the contacts reclosed. This differential permits the motor to cool before restarting can be attempted. As seen in FIG. 2 the slope of the resistivity versus temperature curve is very steep. While this is desirable to obtain a specific predetermined trip temperature it also has the effect of limiting the temperature differential between the trip and reset points.

The operation of condition responsive impedances S2 and S3 are identical to that of S1. Diodes D2, D3 and D4 prevent interaction among the channels so that the particular resistance level of one of the thermistors S1, S2, S3 has virtually no effect in the temperature at which either the other two thermistors will trip the circuit.

Bypass diodes D6, D7, D8 and D9 each half cycle in the negative direction, place essentially all of the voltage from the secondary winding 16 across the thermistors S1–S3 which cause them to self heat so that upon tripping of the circuit there will be a longer delay before the circuit resets. That is, when line L3 is negative with respect to line L4, the impedances are bypassed throwing essentially all of the secondary winding voltage across the thermistors S1–S3 thereby causing them to heat keeping their resistance higher, this raises the voltage level at the anodes of diodes D2–D4 which tends to maintain transistor Q1 on and silicon-controlled rectifier SCR1 off for a longer period of time thereby permitting the load to cool even more. The effect of this may be seen in FIG. 3 which shows the temperature versus time curves, upon tripping of the circuit, curve 30 for a thermistor S1 as used in circuit portion 10; curve 32 for a load, e.g., motor winding; and curve 34 for a thermistor as used in the prior art circuit referenced supra. It will be readily apparent that an improved temperature differential, Δ 1 compared to Δ 2, is achieved by causing the thermistors to be heated to a higher temperature thereby enabling the motor winding more time to cool. Although the same voltage is placed across the thermistors when the relay is closed, the trip temperature is not significantly effected since the resistance of the thermistors near the trip point is much higher than when near the reset point.

Portion 40 of the control apparatus is connected across half of winding 16 and functions in the same way that another channel in the bridge circuit of circuit portion 10 does, that is it produces an input to base b of transistor Q1 in parallel with the three existing inputs of circuit portion 10. Portion 40 comprises several main portions including power source 42, logic circuit 44, timer circuit 46, impedance matching circuit 48 and detector circuit 50.

Power source 42 includes diode D10, capacitor C2, resistor R9 and zener diode Z1. Line L8 is connected to line L3 of circuit portion 10 with diode D10 connected therein to provide D.C. voltage. Capacitor C2 on one side is connected to line L8 and on the other side to common line L9, with resistor R9 and zener diode Z1 connected across C2 to provide a controlled voltage Vss at junction 52 between resistor R9 and zener diode Z1.

Logic circuit 44 includes resistors R10 and R11 serially connected to form a voltage divider with the base of an NPN transistor Q2 connected to junction 54 formed therebetween. The voltage divider is connected across secondary winding 16 forming a bridge circuit with transistor Q2 located in its detector. Diode D11 prevents the A.C. signal of circuit portion 10 from reaching transistor Q2 and forward biasing it.

Timer circuit 46 includes dropping resistor R12 which limits Ic of transistor Q2 connected to voltage supply Vss at 52 and serially connected to resistor R14 and capacitor C3 and then to line L9 with junction 56 formed between resistor R14 and capacitor C3.

Impedance matching circuit 48 includes an emitter follower NPN transistor Q3 the base of which is connected to junction 56. The collector of transistor Q3 is connected to voltage supply junction 52 while the emitter is connected to line L9 through resistors R15, R16 which form junction 58 therebetween. Although a single resistor could be used the combination prevents the threshold from being raised too high. The values are chosen so that the threshold level at point 60 is approximately half of voltage supply Vss. The function of circuit 48 is to match the impedance level between the timing circuit 46 and detector circuit 50.

Detector circuit 50 comprises NPN transistor Q4 whose base is connected to junction 58 of the impedance matching circuit 48 and to point 62 thorugh resistor R20 for a purpose to be explained below. Resistors R18, R19 form a voltage divider connected between voltage supply junction 52 and common line L9. Junction 60 formed between resistors R18, R19 is connected to the emitter of transistor Q4. The collector of transistor Q4 is connected to the base of PNP transistor Q5 and to voltage supply junction 52 through resistor R17. The emitter of transistor Q5 is connected to voltage supply junction 52 while its collector is connected to line L9 through resistor R21 and to line L10 which is connected to base b of transistor Q1 through diode D13 and resistor R4. The collector of transistor Q5 identified at point 62 is also coupled to the base of transistor Q3 in the impedance matching circuit 48 through resistance R22 and diode D14. The value of resistance R17 is chosen to be sufficiently higher than resistors R18, R19 to insure that point 60 is not appreciably affected by resistor R17 when transistor Q4 turns on.

Normally open switch SW1 which in the embodiment described is in the form of a pressure switch is connected to common line L9 on one side, and to junction 56 of the timer portion 46 through resistance R13 and to the collector of transistor Q2 through diode D12.

As mentioned above with reference to circuit portion 10 the sensors S1, S2 and S3 with their respective reference impedances R1, R2 and R3 are connected in parallel with each forming half of a bridge circuit with transformer secondary 16 and controlling transistor Q1 in the detector. Circuit portion 40 is included in circuit portion 10 by adding another leg or channel to the bridge circuit utilizing resistors R10 and R11 controlling tansistor Q2 rather than transistor Q1 and by including another input to transistor Q1 without otherwise appreciably affecting the operation of circuit portion 10.

If any one of sensors S1, S2 or S3 senses an unsafe temperature condition, that is if one of the sensors goes into the high resistance mode, transistor Q1 will become conductive and will shunt current away from the gate of the silicon-controlled rectifier SCR1 preventing it from conducting on the next half cycle thus deenergizing relay coil RY1 and causing contacts RY1B to open to the so-called tripped condition of the system. When this occurs the oil pressure drops and pressure sensor switch SW1 is in the open contact position. Without logic portion 44 the timer portion 46 would go through its sequence and lock out the circuit. However, it is desired that the timer be activated only when the sensors S1, S2 and S3 are in their cool, low resistance mode. Logic circuit 44 is included to determine whether or not the timing sequence should be activated. Circuit 44 detects any change in voltage between point 72 in line L3 side of transformer secondary 16 and point 70 at the junction of the sensors S1–S3 in line L4 as related to the cathode of silicon-controlled rectifier SCR1, point 64, to determine whether relay coil RY1 is energized or deenergized. If point 54 becomes more positive than point 64 then transistor Q2 will be turned on thereby preventing actuation of timing circuit 46. Thus, logic circuit 44 prevents actuation of timer portion 46 if there is a thermal trip in circuit 10.

The detector or threshold circuit 50 provides positive on/off output. It has inherent differential in that once it turns on the input voltage must be decreased to reset the detector. The reference voltage is determined by resistances R18 and R19. That is, the voltage at point 60 in reference to power supply voltage at point 52. If the voltage at point 66 is lower than at 60 then transistor Q4 is non-conductive. In this case, the voltage at point 68 is essentially the same as supply voltage at point 52 therefore the voltage at the base of transistor Q5 is essentially equal to that at the emitter of transistor Q5 and it is non-conductive. If transistor Q5 is non-conductive then point 62 is essentially at common, point 64. Thus transistor Q1 is not forward biased and silicon-controlled rectifier SCR1 is conductive.

If the voltage at point 66 goes higher than point 60 then transistor Q4 is forward biased and becomes conductive and reduces the voltage at 68 essentially to that at point 60. This enables transistor Q5 to conduct because the base emitter junction is forward biased and the voltage at point 62 is raised essentially to that of the power supply point 52.

This will then forward bias transistor Q1 turning it on and silicon-controlled rectifier off. The voltage at 62 is fed back through resistance R20 to raise the voltage at point 66 resulting in more differential and causing the detector to switch with snap action.

The voltage at point 62 is also fed back through resistor R22 and diode D14 to timing capacitor C3 to insure that capacitor C3 remains charged and the system locked out. This system will then remain locked out until the entire circuit is deenergized, as by deenergizing transformer primary winding 14.

Removing power will allow capacitor C3 to discharge through transistor Q3 and resistors R15, R16. Then power may be reapplied with the circuit reset.

The operation of circuit portion 40 will be explained as used in conjunction with circuit portion 10 for an air-conditioning system. As mentioned above sensors S1, S2 and S3 are located in heat exhange relationship with the windings of the compressor motor, as by embedding them within the windings so that in the event the temperature of the windings increases above a safe level, the motor will be promptly deenergized before any deleterious effects occur. Upon energization of the power source silicon controlled rectifier SCR1 will conduct current each half cycle as long as sensors S1, S2 and S3 are in their low resistance mode. Thus relay coil RY1 will be energized and contacts RY1B will be closed permitting energization of the motor. With relay coil RY1 energized logic circuit 44 permits timer circuit 46 to time. Pressure switch SW1 located in the oil sump of the compressor is in the open contacts position until the oil pressure builds up to a predetermined level at which point the switch closes. Assuming that the oil pressure does build up to its normal operating level before the timer capacitor has been fully charged the closing of switch SW1 will cause the capacitor to discharge and will cause the detector circuit 50 to produce 0 voltage output. Thus there is no input to transistor Q1 and energization of the system is allowed to continue. However, if the oil pressure does not reach its operating level by the time the timing capacitor becomes charged then the detector circuit 50 is turned on and an output voltage is produced and fed to transistor Q1 forward biasing it and shunting current away from the gate of silicon controlled rectifier SCR1 deenergizing the system. At the same time the detector circuit 50 output is fed back to the timing capacitor keeping it charged and locking out the system. In order to reenergize a reset the circuit power must be completely removed from transformer 14.

In the event that any one of sensors S1, S2 or S3 goes into the high resistance mode due to excessive temperature in one of the windings, then circuit portion 10 is tripped and a loss of oil pressure results. Junction 54 of logic circuit 44 then becomes more positive than point 64 then Q2 turns on preventing timing of timing circuit 46 thereby preventing lock out of the system.

Figure 4:
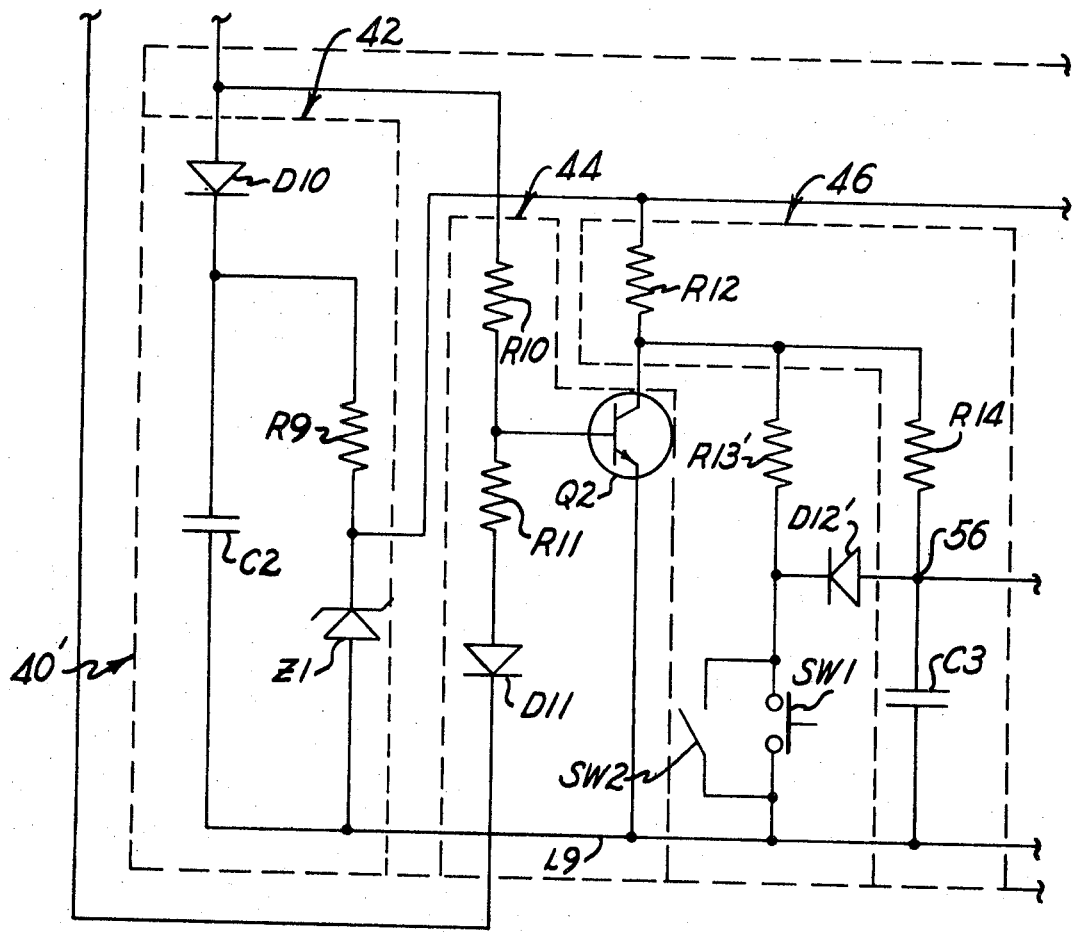
FIG. 4 is a schematic diagram showing a portion of the FIG. 1 schematic using an alternate reset means.

In some instances it may be preferred to provide means to reset circuit 40 without deenergizing transformer 14. This may be accomplished as seen in FIG. 4 by providing a normally open pushbutton switch SW2 across the pressure switch SW1 and by interchanging resistor R13 and diode D12 as indicated by R13' and D12'. Thus, the circuit can be reset by closing switch SW2 and discharging capacitor C3 through the switch.

Figure 5:
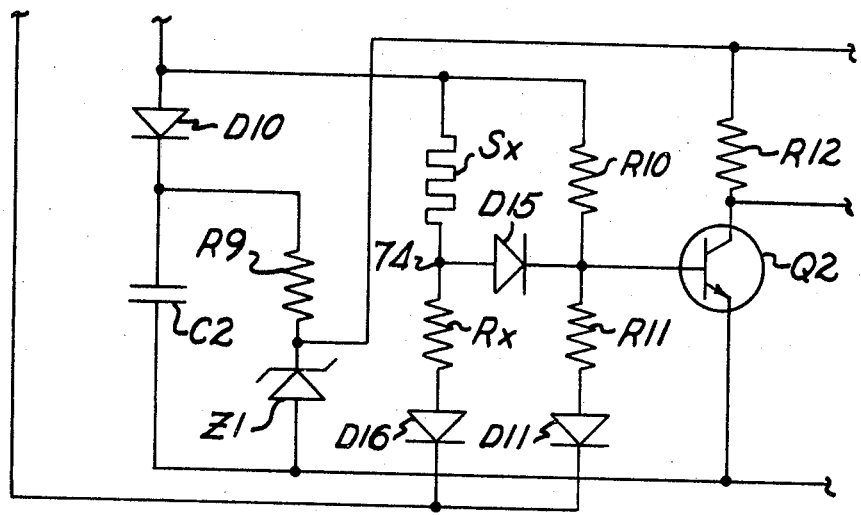
FIG. 5 is a schematic showing a portion of the FIG. 1 schematic using a different form of a sensor.

FIG. 5 illustrates a different form of sensor utilized in place of pressure switch SW1. For instance, a sensor $S_x$ having a positive temperature coefficient of resistance similar to sensors S1–S3 in circuit 10 can be employed. Sensor $S_x$ is mounted so that it is immersed in oil when there is oil flow. The sensor is chosen so that it will self heat due to $I^2R$ heating when it is not immersed. When immersed the heat is transferred to the oil thereby keeping the sensor $S_x$ in the low resistance mode. Thus, the voltage at point 74 is high and transistor Q2 is conductive preventing the timer circuit 44 from going through its sequence. However, should a blockage occur in the oil flow or if the level of the oil becomes insufficient the sensor is exposed and self heats to the high resistance mode so that the voltage at point 74 decreases turning off transistor Q2 and permitting actuation of the timer circuit 46 to lock out the system.

As many changes could be made in the above constructions without departure from the scope of the invention, it is intended that all matter contained in the above description or shown in the accompanying drawings, shall be interpreted as illustrative and not in a limiting sense, and it is also intended that the appended claims shall cover all such equivalent variations as come within the true spirit and scope of the invention.

It is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

I claim:

1. Control apparatus for testing for the existence of a condition after a predetermined period has elapsed following the energization of a load and for deenergizing the load should the condition exist when tested comprising:
   a tapped secondary winding of a transformer, first and second resistances serially connected to form a voltage divider and forming a junction therebetween, the secondary winding and the voltage divider forming a bridge circuit, voltage responsive switch means connected between the tap of the secondary and voltage divider junction;
   relay means for controlling the flow of electrical power to the load, the relay means including a control circuit;
   an electronic element having an output circuit and an input circuit for controlling the conductive state of the output circuit, the output circuit of the electronic element being interconnected with the control circuit of the relay means, the operation of the relay means being dependent upon the conductive state of the electronic element;
   voltage responsive switch means having an output circuit and an input circuit, the input circuit connected to the voltage divider junction, the output circuit connected between a power supply and a common point;
   timing means comprising a capacitor-resistor combination having a timing junction, the capacitor-resistor combination being coupled between common and the output circuit of the voltage responsive switch means;
   a condition responsive switch means coupled between the timing junction and common;
   a detector circuit coupled to the timing junction and having an on-off output coupled to the input of the electronic element to control the conductivity of the output circuit of the electronic element; and
   the voltage divider junction responsive to the state of energization of the relay means causing the voltage responsive switch means to conduct when the relay means is not energized preventing actuation of the timing means, the voltage responsive switch means being non-conductive when the relay means is energized thus permitting actuation of the timing means, the capacitor building up a charge when the condition responsive switch is open causing the detector circuit to produce an output making the electronic element conductive, when the condition responsive switch means is closed the capacitor charge is drained causing the detector circuit to produce no output making the electronic element non-conductive.

2. Control apparatus for testing the existence of a condition after a predetermined period has elapsed following the energization of a load for producing a voltage signal should the condition exist, when tested comprising:
   voltage source means for the control apparatus;
   logic means responsive to the state of energization of the load connected across the power source means to a common point and including a voltage responsive switch having an output circuit;
   timing means having a timing junction and an output and including a timing capacitor connected to the output circuit of the logic means, an output signal from the logic means preventing actuation of the timing means;
   output detector switch means coupled to the timing output and having an on-off voltage output;
   means to feed back the detector switch output to the timing output to lock the detector switch on once it turns on; and
   condition responsive switch means having open and closed operating modes coupled between the timing junction and the common point, any charge on the capacitor being drained when the switch is in closed operating mode when the detector switch has no voltage output.

3. Control apparatus according to claim 2 including means to feed back the detector switch means output to the input of the detector switch means to cause it to turn on with snap action.

4. Control apparatus according to claim 2 in which the detector switch means includes an NPN transistor having a base coupled to the timing junction, the NPN transistor having an emitter-collector circuit connected between the voltage source means and common through a resistor, and a PNP transistor whose base is connected to the collector of the NPN transistor, the emitter collector circuit of the PNP transistor connected between the voltage source and common through a resistor, the output voltage of the detector switch being taken at the collector of the PNP transistor.

5. Control apparatus according to claim 4 including an emitter follower transistor coupled between the timing means and the detector switch means to match impedance therebetween.

6. Control apparatus for producing an output only after a predetermined period of time comprising:
   regulated voltage source means;
   timing means including a resistor-capacitor combination coupled across the voltage source means and a common and having a timing junction;
   detector switch means comprising an NPN transistor having a base comprising the input of the detector switch means coupled to the timing junction, the transistor having an emitter-collector circuit connected between the voltage source means and common through a resistor;
   a PNP transistor whose base is connected to the collector of the NPN transistor, the emitter-collector circuit of the PNP transistor connected between the voltage source and common through a resistor, the output voltage of the detector switch being taken at the collector of the PNP transistor; and means to feed back the detector switch means output voltage to the input of the detector switch means to cause it to turn on with snap action.

7. Control apparatus for producing an output only after a predetermined period of time comprising;
   regulated voltage source means;
   timing means including a resistor-capacitor combination coupled across the voltage source means and a common and having a timing junction;
   detector switch means comprising an NPN transistor having a base comprising the input of the detector switch means coupled to the timing junction, the transistor having an emitter-collector circuit connected between the voltage source means and common through a resistor;
   a PNP transistor whose base is connected to the collector of the NPN transistor, the emitter-collector circuit of the PNP transistor connected between the voltage source and common through a resistor, the output voltage of the detector switch being taken at the collector of the PNP transistor; and
   means to feed back the detector switch means output to the input of the detector switch means to lock the detector switch on once it produces an output voltage.

8. Control apparatus according to claim 2 in which the logic means includes two resistors connected to form a voltage divider and having a junction therebetween, the voltage responsive switch being a logic transistor whose base is connected to the junction of the voltage divider, the emitter-collector circuit of the logic transistor being coupled across the voltage source means and common, the collector of the logic transistor being coupled to the timing means.

9. Control apparatus according to claim 6 including a condition responsive switch means having open and closed operating modes coupled between the timing junction and common, the switch when closed adapted to drain charge from the capacitor.

10. Control apparatus according to claim 9 including means to feed back the detector switch means output voltage to the timing means output to lock the detector switch means on once it produces an output voltage, the detector switch means being locked on even when the condition responsive switch is closed.

11. Control apparatus according to claim 9 including reset contacts connected across the condition responsive switch.

12. Control apparatus according to claim 1 further including:
   a plurality of voltage dividers each of which includes a condition-responsive impedance element serially connected with a reference impedance element, each of the voltage dividers having an electrical junction between the condition-responsive and reference impedance element thereof;
   the voltage dividers being connected in parallel across the secondary winding source; and
   the input of the electronic element being coupled to each of the voltage divider junctions to control the conductivity of the output circuit, whereby the condition-responsive elements function to exercise control over the load device.

13. Control apparatus according to claim 3 in which the feed back means to produce snap action includes a resistor connected between the output of the detector means and input of the detector switch means.

14. Apparatus according to claim 2 in which the feed back means to lock on the detector switch includes a resistor and serially connected diode coupled between the detector switch junction and the timing output.

15. Control apparatus for testing the existence of a condition after a predetermined period has elapsed following the energization of a load for producing a voltage signal should the condition exist, when tested comprising:
   voltage source means for the control apparatus;
   logic means responsive to the state of energization of the load connected across the power source means to a common point and including a voltage responsive switch having an ouput circuit;
   timing means having a timing junction and including a timing capacitor connected to the output circuit of the logic means, an output signal from the logic means preventing actuation of the timing means;
   output detector switch means coupled to the timing junction and having an on-off voltage output and an input;
   means to feed back the detector switch output to the input of the detector switch means to lock the detector switch on once it turns on; and
   condition responsive sensor means having high and low resistance states connected to the voltage responsive switch of the logic means, the voltage responsive switch producing an output signal when the condition responsive sensor means is in one of its two resistance states to prevent actuation of the timing means.

16. Control apparatus according to claim 15 in which the condition responsive sensor means includes a PTC thermistor.

17. Control apparatus according to claim 7 including a condition responsive switch means having open and closed operating modes connected between the timing junction and common, the switch when closed adapted to drain charge from the capacitor 18. Control apparatus according to claim 17 including means to feed back the detector switch means output voltage to the input of the detector switch means to lock the detector switch means on once it produces an output voltage, the detector switch means being locked on even when the condition responsive switch is closed.

19. Control apparatus according to claim 17 including reset contacts connected across the condition responsive switch.

* * * * *